(12) United States Patent
Murray et al.

(10) Patent No.: US 9,457,728 B2
(45) Date of Patent: Oct. 4, 2016

(54) TRANSLATING ROLLER LOAD ASSIST (71) Applicant: THULE SWEDEN AB, Hillerstorp (SE)

(72) Inventors: Frederick G. Murray, Southington, CT (US); Kevin W. Harris, Middlebury, CT (US)

(73) Assignee: Thule Sweden AB, Hillerstorp (SE)

( * ) Notice: Subject to any disclaimer, the term of this patent is extended or adjusted under 35 U.S.C. 154(b) by 224 days.

(21) Appl. No.: 14/282,757

(22) Filed: May 20, 2014

(65) Prior Publication Data
US 2014/0252056 A1 Sep. 11, 2014

Related U.S. Application Data (63) Continuation of application No. 11/835,693, filed on Aug. 8, 2007, now Pat. No. 8,733,604.

(60) Provisional application No. 60/821,817, filed on Aug. 8, 2006.

(51) Int. Cl.
*B60R 9/04* (2006.01)
*B60R 9/042* (2006.01)
*B60R 9/08* (2006.01)

(52) U.S. Cl.
CPC *B60R 9/042* (2013.01); *B60R 9/08* (2013.01)

(58) Field of Classification Search
CPC ...................................................... B60R 9/042
See application file for complete search history.

(56) References Cited

U.S. PATENT DOCUMENTS

| | | |
|---|---|---|
| 2,148,245 A | 2/1939 | Verne-Runkle |
| 3,924,764 A | 12/1975 | Youngblood |
| 4,058,243 A | 11/1977 | Tappan |
| 4,081,095 A | 3/1978 | Wilburn et al. |
| 4,087,029 A | 5/1978 | Shoemaker |
| 4,531,879 A | 7/1985 | Horowitz |
| 4,830,249 A | 5/1989 | Mirenda et al. |
| 4,877,169 A | 10/1989 | Grim |
| 4,953,757 A | 9/1990 | Stevens et al. |
| 5,505,579 A * | 4/1996 | Ray ......................... B60R 9/042 224/310 |
| 5,511,928 A | 4/1996 | Ellis |
| 5,609,462 A * | 3/1997 | Reimer ................. B60P 3/1025 224/310 |
| 5,624,063 A | 4/1997 | Ireland |
| 5,690,259 A | 11/1997 | Montani |
| 5,904,463 A | 5/1999 | Christensen |

(Continued)

FOREIGN PATENT DOCUMENTS

| | | |
|---|---|---|
| DE | 3102863 | 9/1982 |
| DE | 4010175 | 10/1991 |

*Primary Examiner* — Brian D Nash
(74) *Attorney, Agent, or Firm* — Sterne, Kessler, Goldstein & Fox P.L.L.C.

(57) ABSTRACT

A roller load assisted roof-top carrier for elongate articles such as kayak boats. The roof-top carrier includes a space frame having at least a U-shaped portion, the legs of which are each slidingly mountable to each of a front and back cross bar of a vehicular roof rack. In this manner, the space frame translates unitarily relative to the vehicular roof rack. Forward and back cross members are provided that are mounted upon the space frame, the front cross member carrying a pair of kayak saddles, each faced with a friction inducing material for discouraging slippage between a secured kayak and the space frame and the back cross member carrying a pair of guide panels, each faced with a slip inducing material for encouraging slippage between a kayak being loaded on or unloaded from the space frame. A roller can be mounted on a back portion of the space frame.

20 Claims, 9 Drawing Sheets

(56) References Cited

U.S. PATENT DOCUMENTS

| | | |
|---|---|---|
| 5,951,231 A | 9/1999 | Allen |
| 5,957,350 A | 9/1999 | Giles |
| 6,164,507 A | 12/2000 | Dean et al. |
| 6,516,984 B1 | 2/2003 | Kmita et al. |
| 6,705,822 B2 | 3/2004 | Oldak |
| 6,715,652 B2 | 4/2004 | Kmita et al. |
| 8,242,893 B1 | 8/2012 | Lin |
| 8,245,893 B2 * | 8/2012 | Sautter .................. B60R 9/042 224/310 |
| 2008/0193265 A1 | 8/2008 | Sautter et al. |

* cited by examiner

TRANSLATING ROLLER LOAD ASSIST

CROSS-REFERENCE TO RELATED APPLICATIONS

This application is a continuation of U.S. application Ser. No. 11/835,693, which was filed on Aug. 8, 2007, now issued U.S. Pat. No. 8,733,604, which claims priority to U.S. provisional application No. 60/821,817, which was filed on Aug. 8, 2006, the entire contents of which are incorporated by reference herein.

DETAILED DESCRIPTION:

Vehicular roof-top load carriers for elongate articles such as kayaks and ladders are well known. Among other reasons, the location of these types of racks atop the vehicle is advantageous because they provide a relatively unobstructed area where such long items can be carried without unnecessarily extending beyond the bounds of the vehicle below.

Where kayaks are concerned, traditional carrier design has included paired guide (or glide) plates and/or saddles, the former usually substantially vertically oriented and faced with a slide promoting material such as felt and the later usually more horizontal in orientation and faced with a friction promoting material such a neoprene or the like.

During loading, the kayak is initially "threaded" from the back of the vehicle between the guides or glide plates and then slid forward until the bow of the boat is resting on the front saddles with the stern of the boat resting on a roller or other support, between the guides. Heretofore, the front-to-back spacing between the saddles and glide plates has been dependent on the spacing of the cross bars of the underlying rack system as the saddles have been fixedly mounted to the front cross bar while the glide plates have been mounted to the back cross bar of a conventional roof-top rack system. This limited arrangement has several design weakness. The first is that the referenced front to back spacing between the saddles and guides is fixed without regard for the characteristics of the kayak that will actually be loaded and transported on the carrier. Therefore for longer boats the supports may be too close together under the mid-region of the boat to provide adequate stability which can result in a tendency for the boat to "teeter" atop the fulcrum established when the closely spaced cross bars. Such a configuration can be appreciated referring to FIG. 1 and imagining that the back guide plates (top left) and the front saddles (bottom right) are mounted on the longer interior cross bars of the underlying vehicle rack instead of the distally located and shorter cross members of the sliding space-frame which is the subject of the present disclosure.

Figure 1:
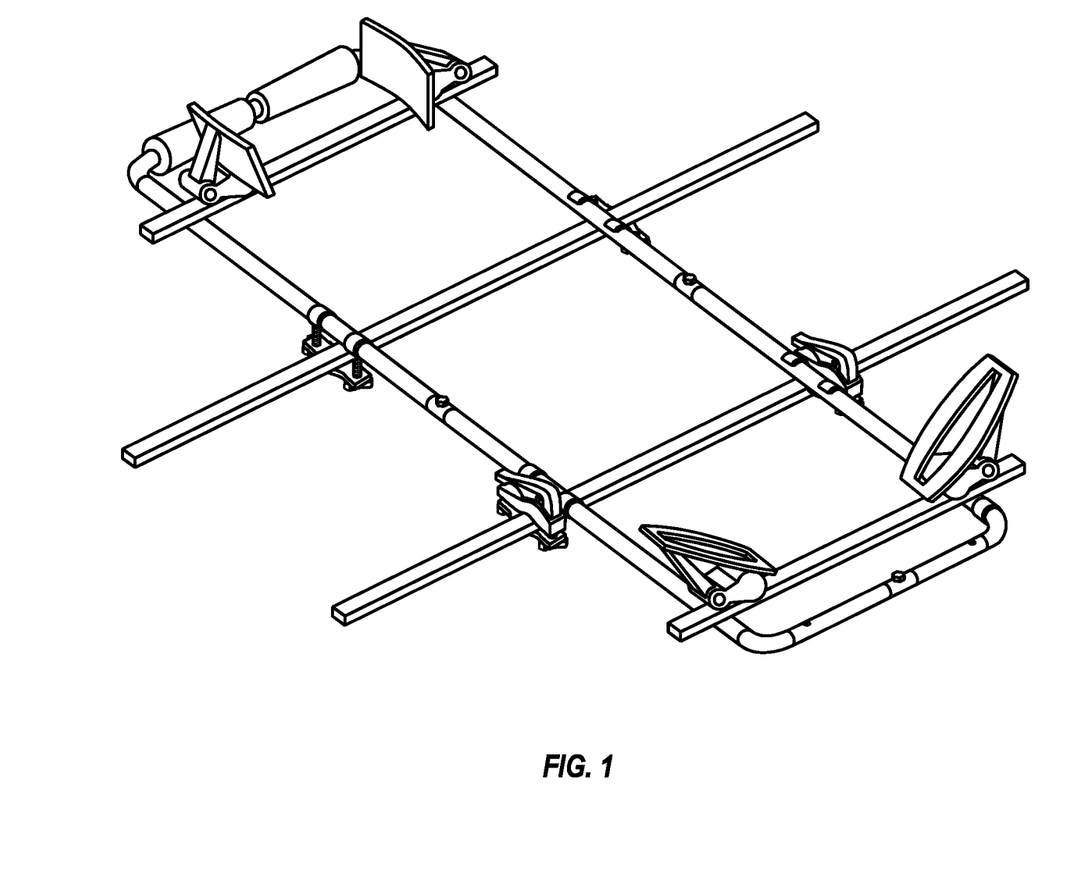
FIG. 1 illustrates a roller load assisted vehicular roof-top carrier.

Referring to FIG. 1, a design solution is depicted in which a translating space-frame is slidingly mounted to the two cross bars of the vehicular rack. The frame itself is basically rectangular in shape and is composed of multiple joined pieces. While depicted as having many tubular sections in FIG. 1, it is considered satisfactory to have a front-half, C-bend and a back-half, C-bend which are releasably joined together (see joint midway between the vehicular cross bars). Among other benefits, the use of a plurality of joined-together sections permits the rack to be shipped very compactly.

The use of roller load assists is not new; they have been known in such arrangements that facilitate roof-top, long-boat loading for some time. A problem, however, has been encountered when a roller such as that shown at the top left hand end of FIG. 1 has been mounted to a single vehicular cross bar. In at least one such known design, the rollers are installed on the bight portion of a U-shaped support member; however, the legs of the "U" were connected to only one vehicle cross bar. During loading, the U-support would be pulled out toward the back of the vehicle, but this increases the lever arm between the roller and the point of attachment to the cross bar with the primary detrimental effect being an unacceptable torquing (twisting) of the supporting cross bar when the weight of the boat was added upon the roller. In order to avoid such high twisting forces, the extension length of such rollers has had to be limited. This also precipitated a problem in which the roller cannot be positioned far enough back to clear the back edge of the vehicle and thereby rendered the conventional roller load assist inadequate under certain circumstances.

The rectangular space frame of FIG. 1 alleviates the drawbacks described above, as well as delivers additional benefits. When assembled, the space frame is substantially rigid and reciprocates forward-and-back in four guides, each mounted to a cross bar of the vehicular rack. With the space frame spanning the two vehicular cross bars, essentially no torquing is induced in either of the bars which is a significant improvement over the previously known designs.

The guides are configured to transition between a constricted, locked configuration and an expanded slide-permitting configuration. In the constricted configuration, the guides are pinched tight around the space frame thereby locking it into place relative to the vehicle. This will be affected in two primary positions; the first being when the roller is moved back, preferably outside the bounds of the vehicle ready to accept a boat bow and assist in the loading process and the second being when the frame is slid forward with the boat loaded thereon for better weight distribution across the vehicular cross bars. In the illustrated embodiment, the pinching action of the guide is induced by a cam lever that when rotated to a closed position causes a tight pinch to be applied to the sliding frame members. In an opposite, loosened configuration of the cam lever, the guide is relaxed and allowed to expand away from the entrapped space frame thereby permitting translational movement of the frame in the guides.

The forward-to-back elongate nature of the space frame permits the location of the saddle and guide bearing cross members to be strategically located adjacent bulkheads of the boat when in the transporting configuration. This is advantageous in that the bulkhead regions of the boat are the most fortified and it is at the saddles and guide plates that securement straps are normally cinched down. Therefore, tightly cinched tie-down straps will be wrapped around the parts of the boat that can best withstand such constriction thereabout.

It is also contemplated that the space frame may not be completely rectangular with two U-shaped halves, but may be composed of just one U-bend; however, the legs of such a U-bend would be anchored across both vehicular cross bars, and not allowed to twist about just one cross bar alone in the extended configuration.

Figure 2:
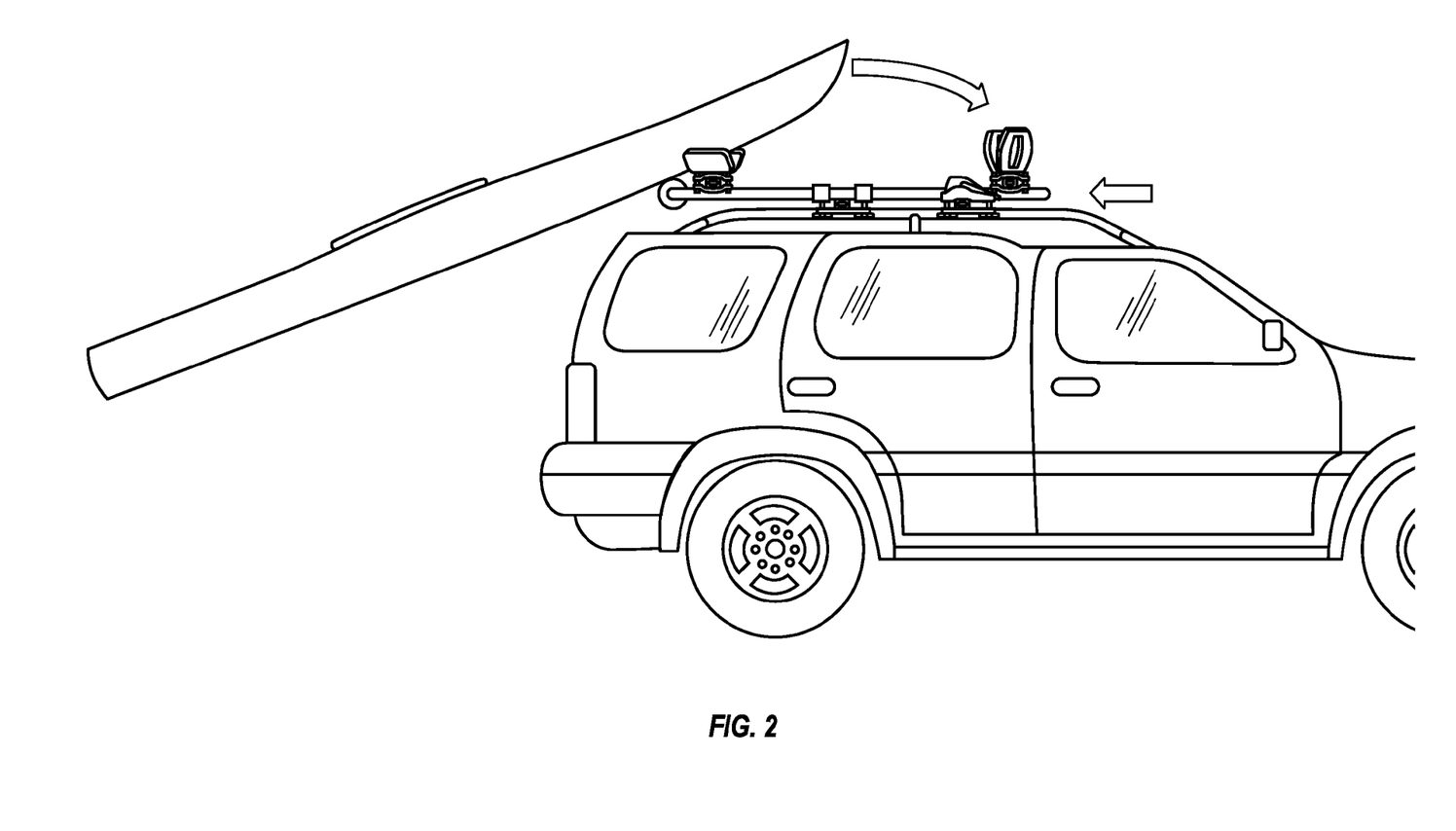
FIG. 2 illustrates a roller load assisted roof-top carrier in an extended configuration.

FIG. 2 depicts the roller load assisted roof-top carrier in an extended configuration with the bow of a kayak resting on the roller, positioned between the pair of guide panels.

Figure 3:
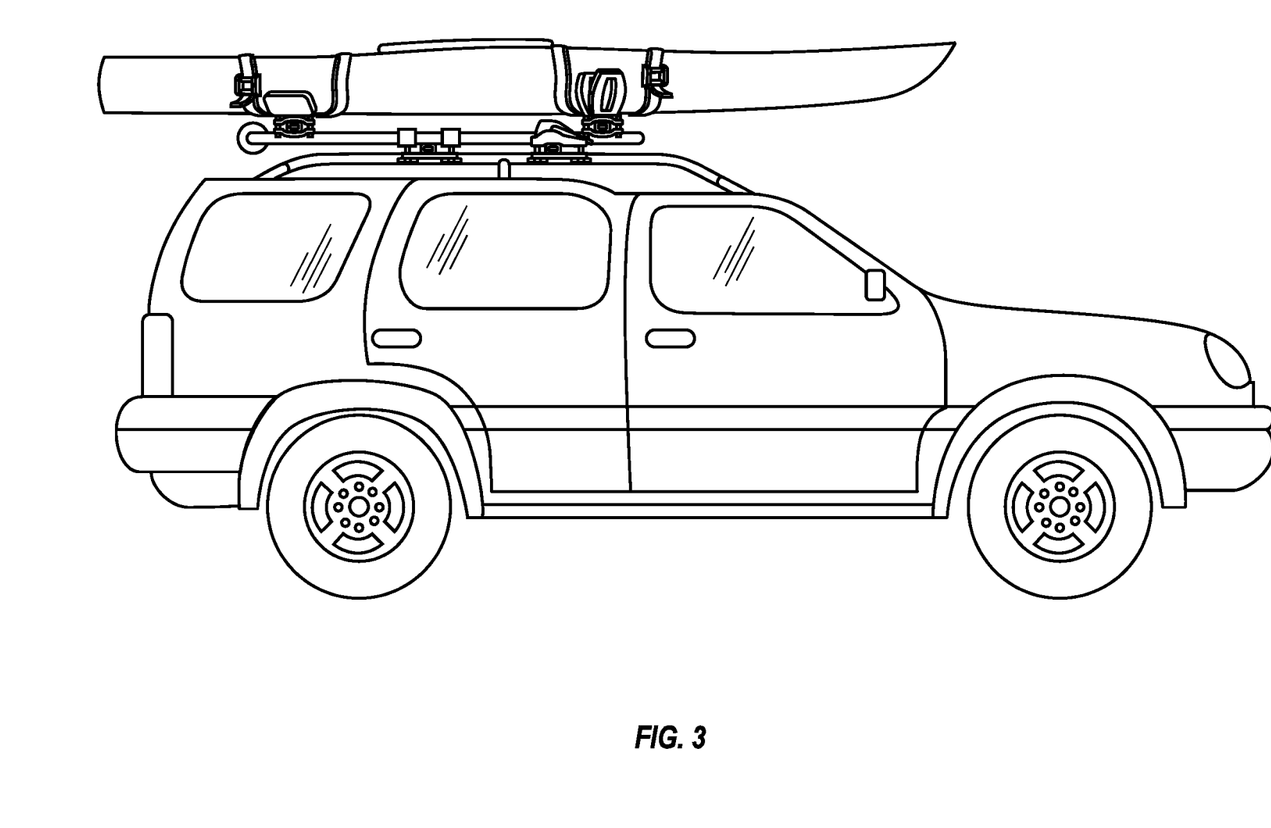
FIG. 3 illustrates a carrier with a kayak fully loaded and secured.

FIG. 3 depicts the carrier with the kayak fully loaded and secured, but still in the extended-back configuration.

Figure 4:
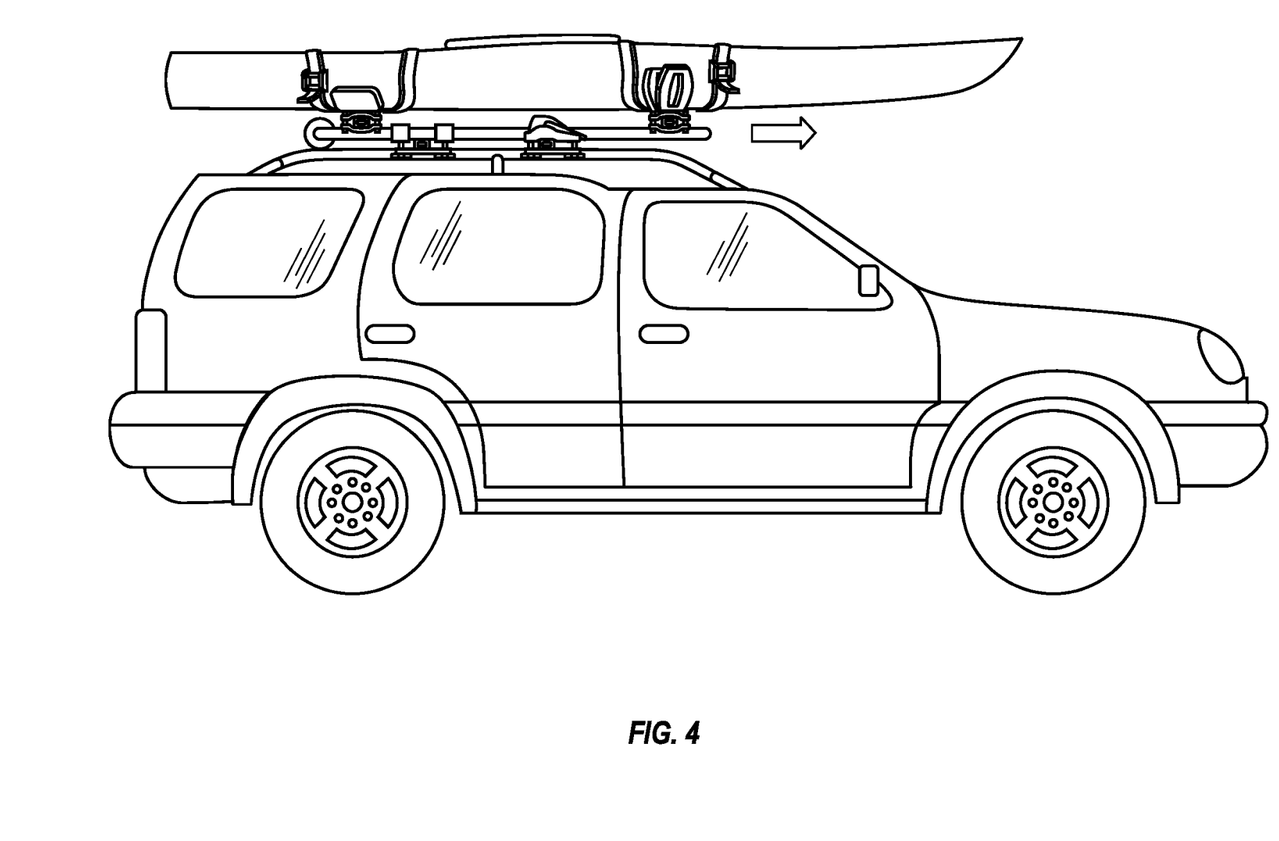
FIG. 4 illustrates a carrier with a space frame slid forward into a transport configuration.

FIG. 4 shows the space frame slid forward into the transport configuration, predominantly balanced between the front and back cross bars of the vehicle rack.

Figure 5:
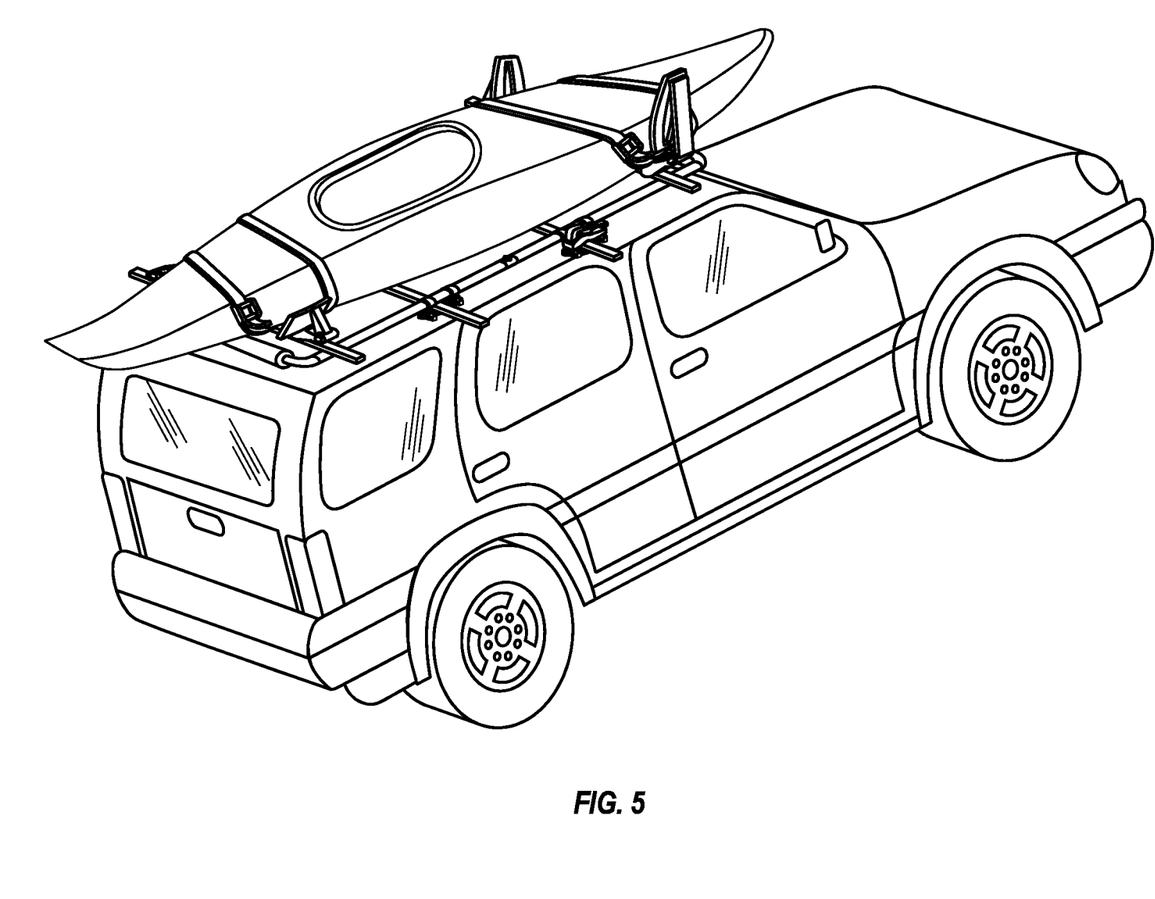
FIG. 5 illustrates a right-hand perspective view of a fully loaded, ready-for-transport kayak.
Figure 6:
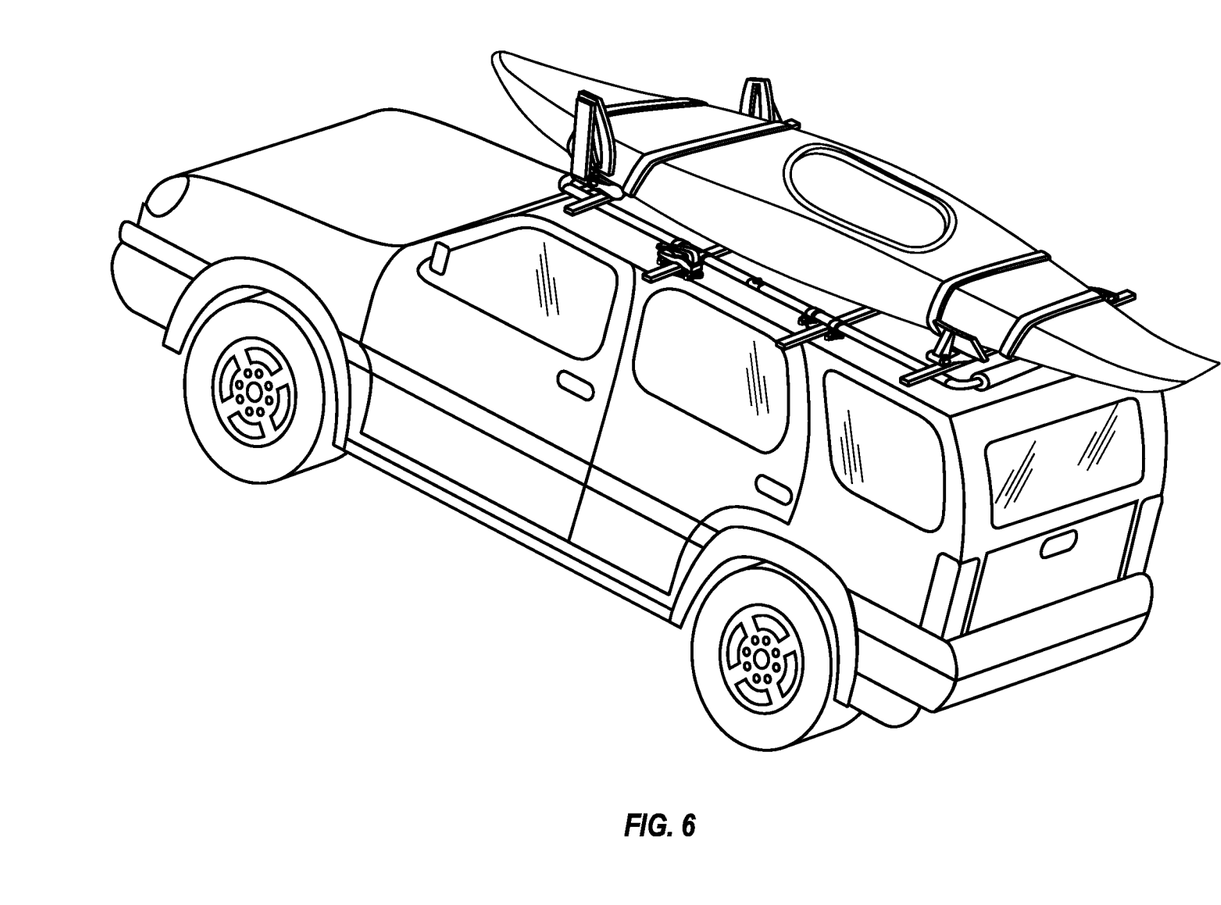
FIG. 6 illustrates a similar configuration to that illustrated in FIG. 5, but from the left hand side.

FIG. 5 shows a right-hand perspective view of the fully loaded, ready-for-transport kayak, while FIG. 6 shows a similar configuration, but from the left hand side.

Figure 7:
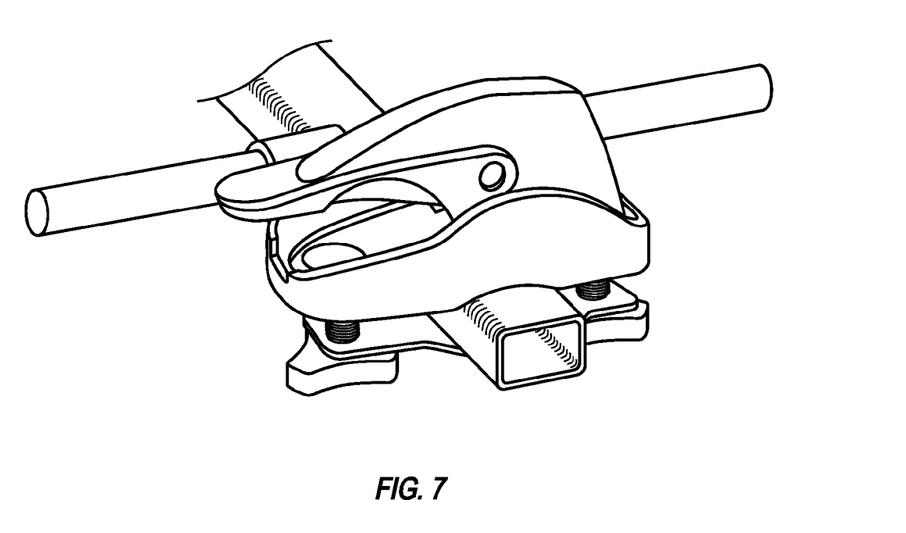
FIG. 7 is a close-up, detailed view of a levered cam arrangement for a carrier.

FIG. 7 provides a close-up, detailed view of a levered cam arrangement that expands and contracts about the space frame to permit and deny translational movement of the space frame, respectively.

Figure 8:
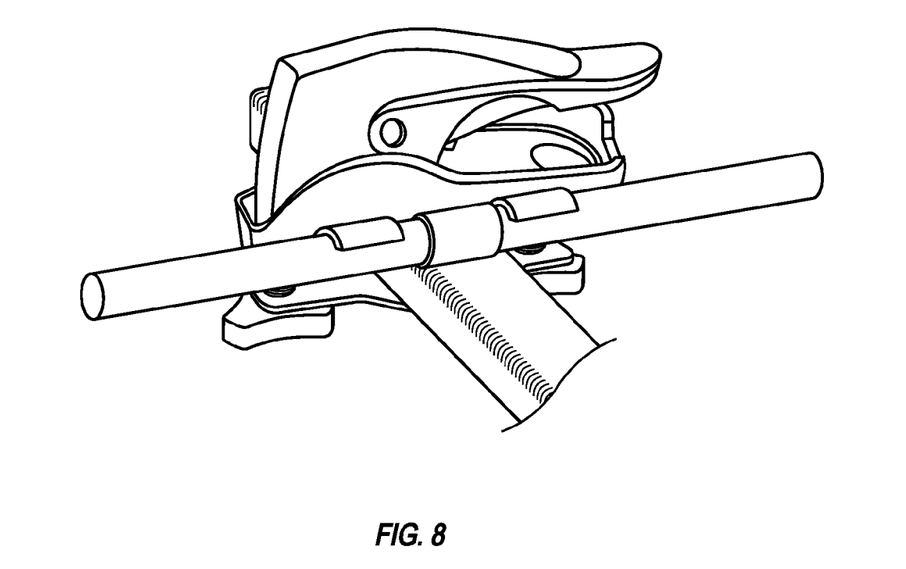
FIG. 8 is an inside view of the levered cam securement arrangement of FIG. 7.

FIG. 8 is an inside view of the levered cam securement arrangement of FIG. 7.

Figure 9:
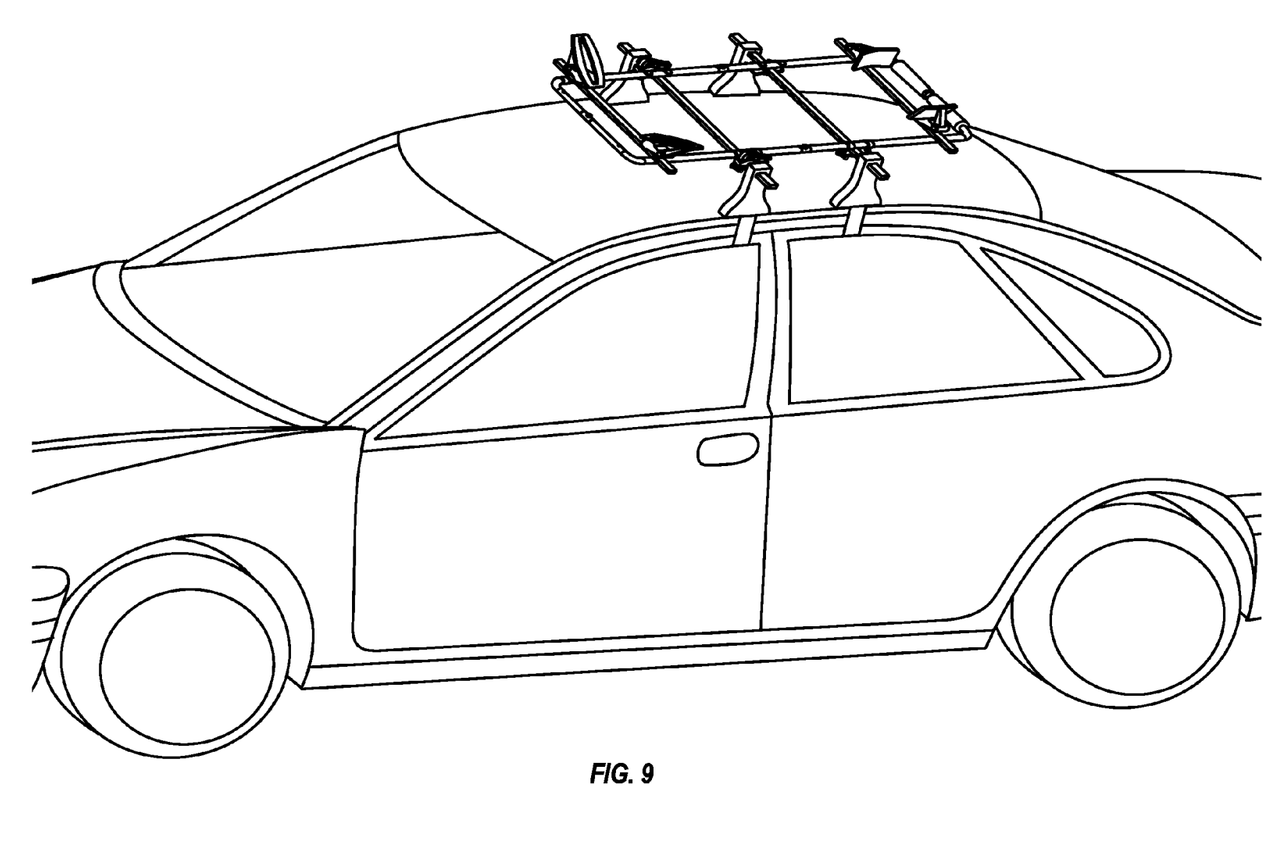
FIGS. 9 and 10 each show a rack configured according to the presently disclosed teachings, installed atop a car.
Figure 10:
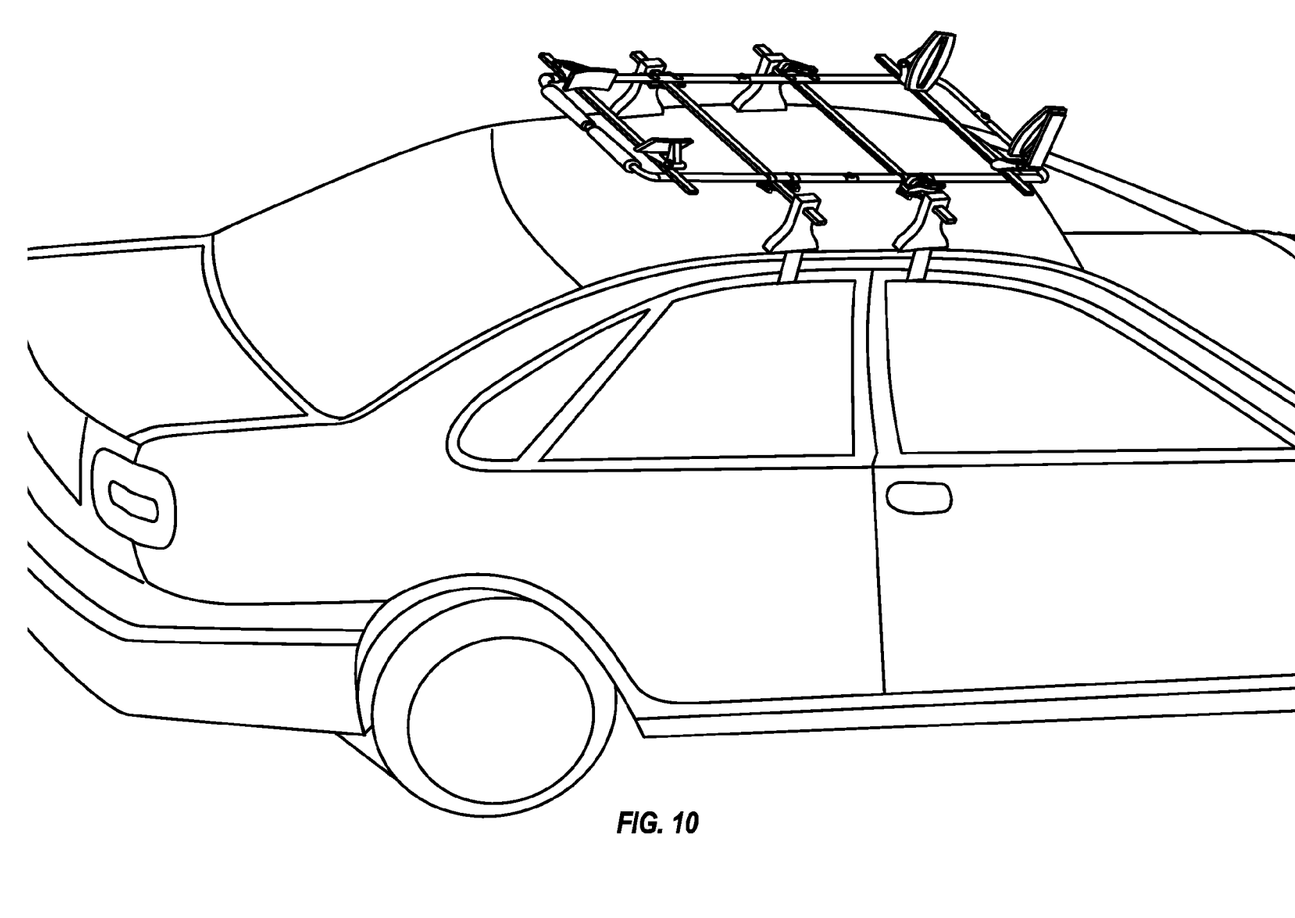

FIGS. 9 and 10 each show a rack configured according to the presently disclosed teachings, installed atop a car and taken from a front and back perspective, respectively.

The invention claimed is:

1. A vehicular roof-top load carrier mountable on the roof of a vehicle for carrying articles, the carrier comprising:
   two legs connectable by a base portion to form a U-shaped frame having a long axis;
   the base portion having an article engagable portion and each leg being mountable crosswise to vehicular cross bars, the long axis of the U-shaped frame extendable parallel to a long axis of a carrying vehicle;
   a guide member having a receiving portion configured to receive at least one of the legs;
   the guide member having a locked configuration wherein a leg received therein is pinched within the receiving portion, thereby locking the received leg in place, and a slide permitting configuration, wherein the received leg is not pinched within the receiving portion, thereby permitting translational movement of the received leg within the receiving portion; and
   a lever, actuable to transition the guide member between the locked configuration and slide permitting configuration,
   wherein in the slide permitting configuration the received leg is translatable from a contracted position to an expanded position in which the article engagable portion of the base portion is extended further from the guide member than in the contracted position.

2. The vehicular roof-top load carrier of claim 1, wherein the lever is rotatably actuable.

3. The vehicular roof-top load carrier of claim 1, wherein the receiving portion of the guide member comprises a tubular portion which at least partially encircles the received leg.

4. The vehicular roof-top load carrier of claim 1, wherein the article engagable portion of the base portion has one or more rollers.

5. The vehicular roof-top load carrier of claim 1, the base portion comprising a rod extendable between the legs, thereby forming a U-shape.

6. The vehicular roof-top load carrier of claim 5, wherein the base portion is connectable to the legs at one end of each leg, thereby forming a U-shape.

7. The vehicular roof-top load carrier of claim 1, further comprising one or more rollers joinable with the U-shaped frame to enable an article to be loaded upon the load carrier.

8. The vehicular roof-top load carrier of claim 1, wherein the guide member comprises a clamping member configured to mount the guide member to at least one of the vehicular cross bars.

9. The vehicular roof-top load carrier of claim 1, further comprising saddles locatable across from one another, each positionable proximate one leg of the U-shaped frame.

10. A vehicular roof-top load carrier for carrying articles comprising:
    a frame comprising two legs connectable by a base portion, the two legs and base portion together forming a U-shape when connected;
    the base portion having an article engagable portion and each leg being mountable crosswise to vehicular cross bars, a long axis of the U-shaped frame extendable parallel to the long axis of a carrying vehicle;
    a guide member having a receiving portion for receiving at least one of the legs;
    the guide member having a locked configuration wherein a leg received therein is pinched within the receiving portion, thereby locking the received leg in place, and a slide permitting configuration, wherein the received leg is not pinched within the receiving portion, thereby permitting translational movement of the received leg within the receiving portion; and
    a lever, actuable to transition the guide member between the locked configuration and slide permitting configuration,
    wherein in the slide permitting configuration the received leg is translatable from a first position to a second position wherein the article engagable portion of the base portion is further from the guide member than in the first position.

11. The vehicular roof-top load carrier of claim 10, wherein the lever is rotatably actuable.

12. The vehicular roof-top load carrier of claim 10, wherein the receiving portion of the guide member comprises a tubular portion which at least partially encircles a portion of the received leg.

13. The vehicular roof-top load carrier of claim 10, wherein the article engagable portion of the base portion has one or more rollers.

14. The vehicular roof-top load carrier of claim 10, the base portion comprising a rod extendable between the legs, thereby forming a U-shape.

15. The vehicular roof-top load carrier of claim 14, wherein the base portion is configured to connect the legs at one end of each leg, thereby forming a U-shape.

16. The vehicular roof-top load carrier of claim 10, further comprising one or more rollers joinable with the U-shaped frame, thereby enabling an article to be loaded upon the load carrier.

17. The vehicular roof-top load carrier of claim 10, wherein each guide member comprises a clamping member configured to mount a respective guide member to the vehicular cross bars.

18. The vehicular roof-top load carrier of claim 10, further comprising saddles locatable across from one another, each positionable proximate one leg of the U-shaped frame.

19. A vehicular roof-top load carrier for carrying articles on the roof of a vehicle, the carrier comprising:
- two legs connected by a base portion and forming a U-shaped frame having a long axis;
- the base portion having an article engagement portion and each leg being mountable crosswise to vehicular cross bars, the long axis of the U-shaped frame extending parallel to a long axis of a carrying vehicle;
- a guide member having a receiving portion receiving at least one of the legs;
- the guide member having a locked configuration wherein a leg received therein is pinched within the receiving portion, thereby locking the received leg in place, and a slide permitting configuration, wherein the received leg is not pinched within the receiving portion, thereby permitting translational movement of the received leg within the receiving portion; and
- a lever, actuable to transition the guide member between the locked configuration and slide permitting configuration,
- wherein in the slide permitting configuration the received leg is translatable from a contracted position to an expanded position in which the article engagable portion of the base portion is extended further from the guide member than in the contracted position.

20. A vehicular roof-top load carrier for carrying articles comprising:
- a frame comprising two legs connected by a base portion, the two legs and base portion together forming a U-shape;
- the base portion having an article engaging portion and each leg being mountable crosswise to vehicular cross bars, a long axis of the U-shaped frame extending parallel to the long axis of the vehicle;
- a guide member having a receiving portion for receiving at least one of the legs;
- the guide member having a locked configuration wherein a leg received therein is pinched within the receiving portion, thereby locking the received leg in place, and a slide permitting configuration, wherein the received leg is not pinched within the receiving portion, thereby permitting translational movement of the received leg within the receiving portion; and
- a lever, actuable to transition the guide member between the locked configuration and slide permitting configuration,
- wherein in the slide permitting configuration the received leg is translatable from a first position to a second position wherein the article engagable portion of the base portion is further from the guide member than in the first position.

* * * * *